H. A. W. WOOD.
FINISHING MECHANISM FOR STEREOTYPE PLATES.
APPLICATION FILED SEPT. 4, 1915.

1,259,948.

Patented Mar. 19, 1918.
8 SHEETS—SHEET 1.

Fig. 1.

Inventor
Henry A. Wise Wood
By Attorneys.
Southgate & Southgate.

H. A. W. WOOD.
FINISHING MECHANISM FOR STEREOTYPE PLATES.
APPLICATION FILED SEPT. 4, 1915.

1,259,948.

Patented Mar. 19, 1918.
8 SHEETS—SHEET 4.

Fig. 4.

Inventor
Henry A. Wise Wood.
By Attorneys
Southgate & Southgate

H. A. W. WOOD.
FINISHING MECHANISM FOR STEREOTYPE PLATES.
APPLICATION FILED SEPT. 4, 1915.

1,259,948.

Patented Mar. 19, 1918.
8 SHEETS—SHEET 7.

Inventor
Henry A. Wise Wood
By Attorneys
Southgate & Southgate

UNITED STATES PATENT OFFICE.

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA.

FINISHING MECHANISM FOR STEREOTYPE-PLATES.

1,259,948.     Specification of Letters Patent.     Patented Mar. 19, 1918.

Original application filed January 12, 1910, Serial No. 537,700. Divided and this application filed September 4, 1915. Serial No. 48,985.

*To all whom it may concern:*

Be it known that I, HENRY A. WISE WOOD, a citizen of the United States, residing at New York, in the county of New York and State of New York, have invented a new and useful Finishing Mechanism for Stereotype-Plates, of which the following is a specification.

This invention relates to a machine for finishing stereotype printing plates. While some of the features thereof are capable of use generally for that class of machines, yet the invention is illustrated in a form in which it is particularly applicable to the finishing of flat plates.

Among the objects of the invention are to provide a new machine adapted automatically to take the cast plate, trim, shave and deliver it; to provide a first carrier having an adjustable stroke for plates of different sizes and having hooks adjustable sidewise to accommodate said plates; to provide an improved shaving knife having a preceding spring-pressed roll to prevent buckling of the plate and hold the plate in position; to provide convenient and practicable means for trimming two edges of each plate and then the other edges; and also to provide an improved arrangement of the first saws and shaving mechanism for certain classes of work. The invention also involves improvements in various details of construction as will appear hereinafter.

Reference is to be had to the accompanying drawings, in which—

Fig. 7 is a similar view showing the plate partially trimmed on the edge;

Fig. 7$^a$ is a transverse sectional view of the upper box or support for the plate on the line 7$^a$ 7$^a$ of Fig. 7.

Figure 1:
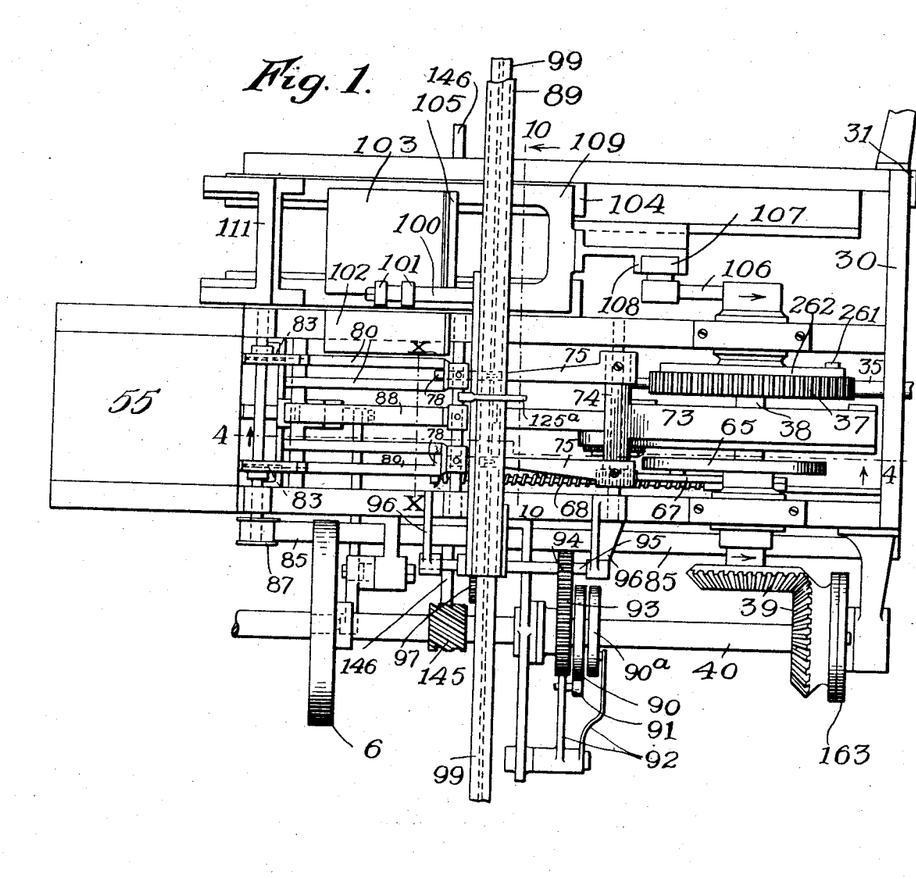
Figure 1 is a plan of a flat stereotype plate finishing machine constructed in accordance with this invention with some parts removed so that interior construction can be seen.
Figures 2, 5:
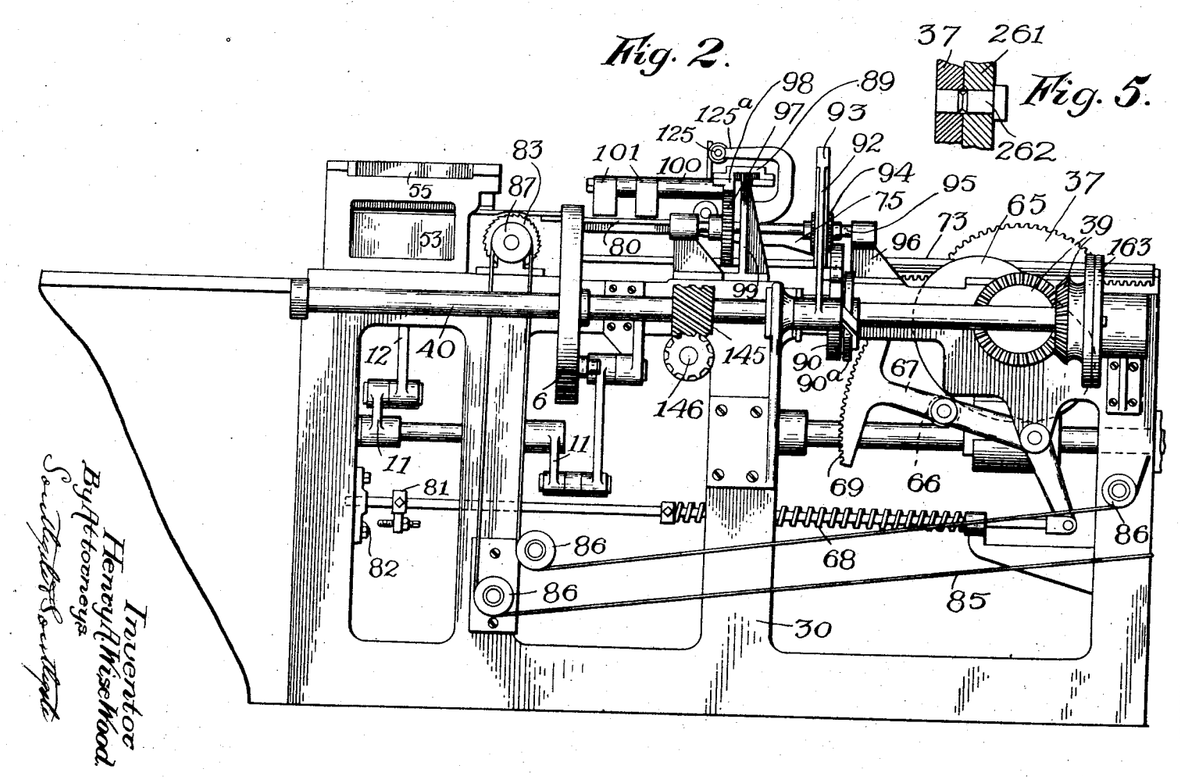
Fig. 2 is a side elevation of the same with parts removed.
Fig. 5 is a sectional view of a detail.
Figure 3:
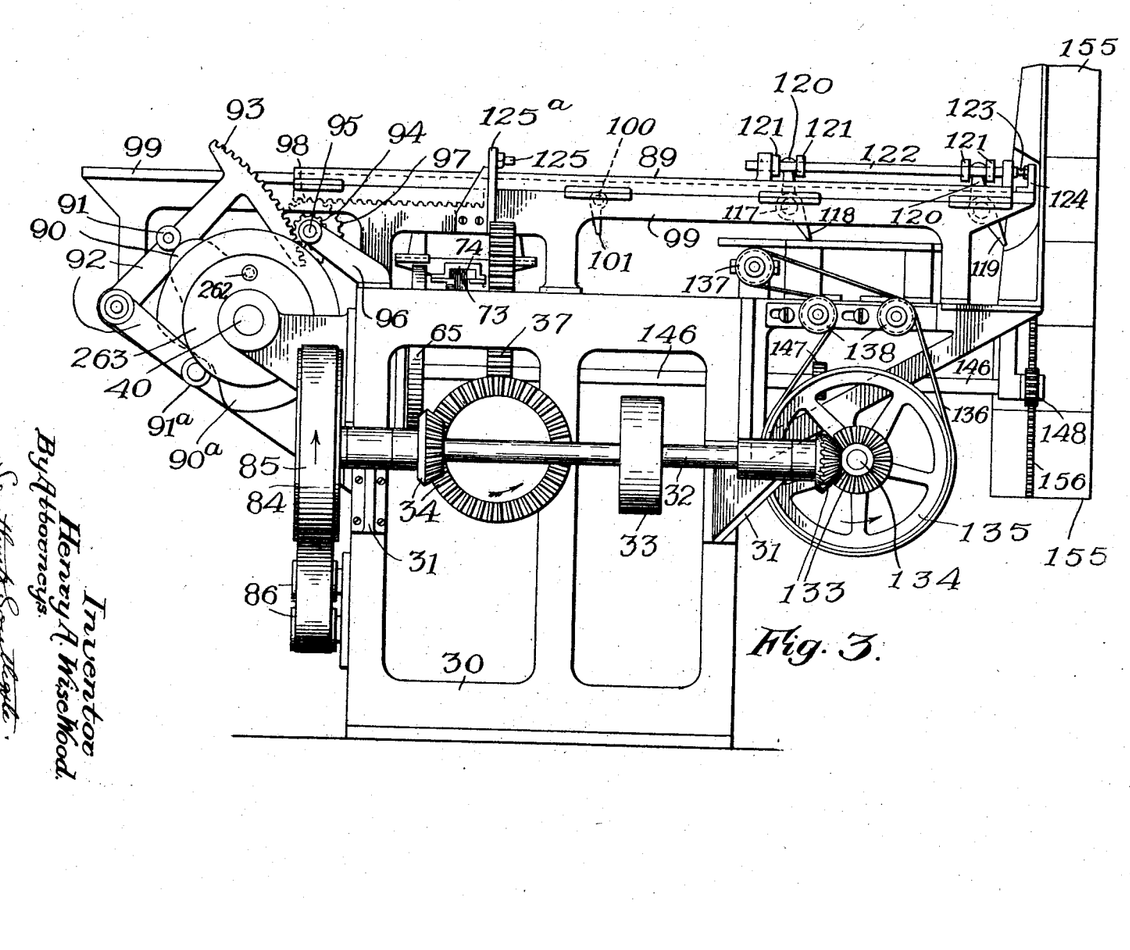
Fig. 3 is an end elevation of the same.
Figure 4:
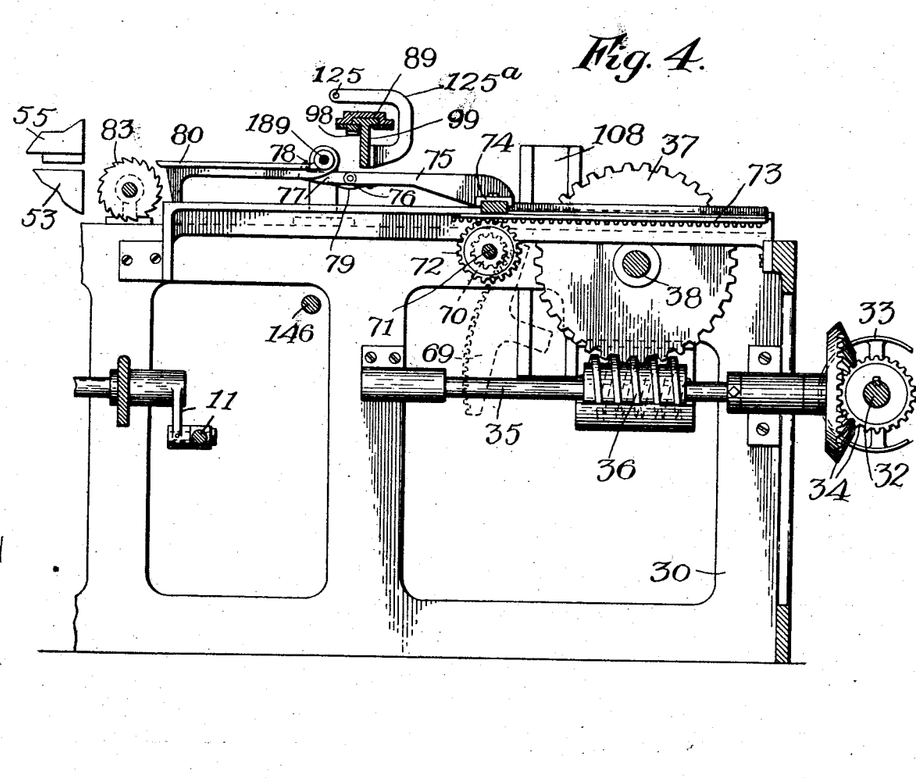
Fig. 4 is a sectional view on the line 4—4 of Fig. 1.
Figures 8, 9:
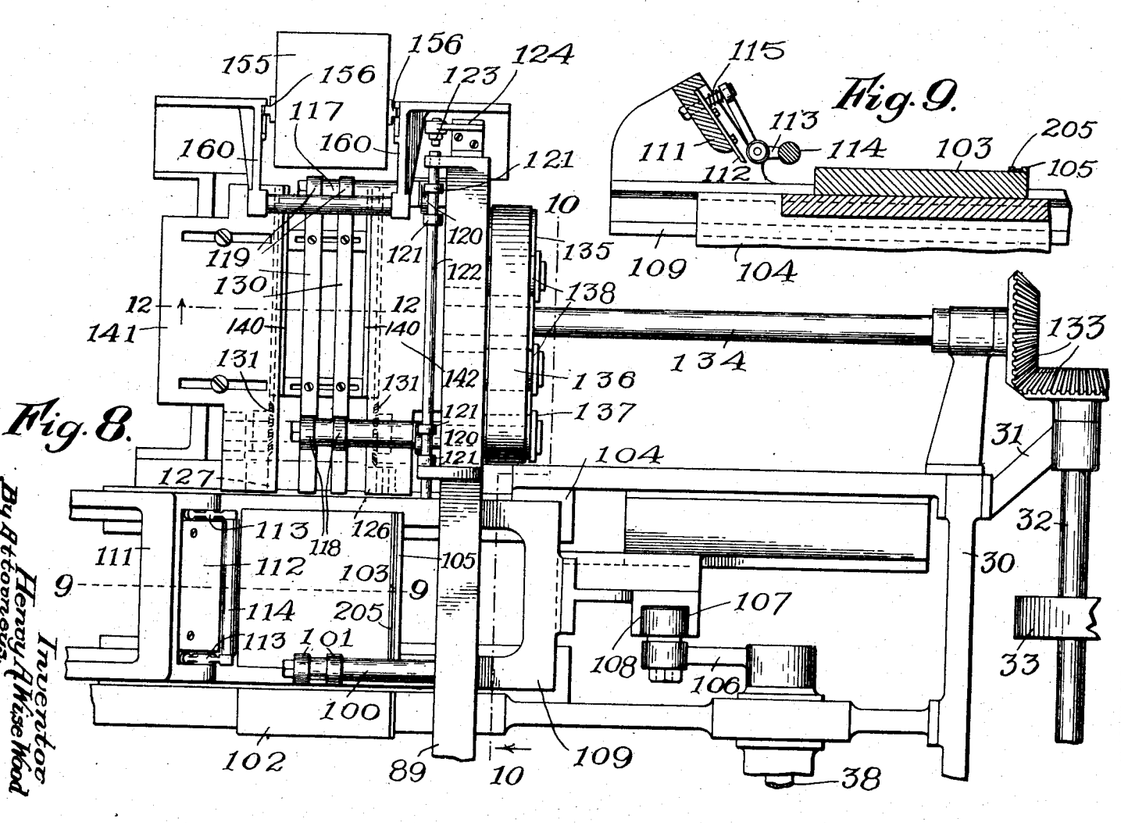
Fig. 8 is a plan of a portion of the device at the rear of the portion shown in Fig. 1.
Fig. 9 is a sectional view on the line 9—9 of Fig. 8.

This invention is shown in a form embodying a frame 30 having means for supporting various parts of the machine. At one end of the frame are brackets 31 supporting the transverse driving shaft 32 which is provided with a driving pulley 33 (Figs. 3, 4 and 8). By bevel gears 34 this shaft drives a short longitudinal shaft 35 having a worm 36 for driving a worm wheel 37 fast on a transverse shaft 38 (Figs. 1, 2 and 4) which by bevel gears 39 drives a longitudinal shaft 40 at the front side of the machine.

The two casting boxes 53 and 55 constitute plate supports. Side gages 59 which form the bevels of the sides of the plates are fastened to the upper casting box 55. When the plate is removed from the casting box, as will be explained hereinafter, the upper inner beveled edges of these gages act as guides for the sides of the plates. The casting box is also provided with end gages 63 and 64. The one at the head end of the plate has a longitudinal projection 62 which forms a transverse groove P$^3$ in the cast plate P for the first carrier hooks. This notch or groove is made use of in withdrawing the plate from the casting box. The lower box is moved up and down by a cam 6 on the shaft 40. By connections 11 this cam operates a link 12 connected with the box 53.

On the shaft 38 is a cam 65 which operates a roller 66 on a lever 67. This lever is held up by a spring 68 so that the roller engages the cam surface. On the end this lever is provided with a gear segment 69 meshing with a pinion 70 on a transverse shaft 71 so that this shaft will be caused to oscillate. On this shaft is a gear or pinion 72 which operates a sliding rack 73. On this sliding rack is a cross bar 74 to which are adjustably fixed a pair of arms 75 that extend forward. Each of the arms is provided with a pivot pin 76 on which is pivotally mounted a finger 77 having a hook 78 thereon adapted to engage in the notch P³. A spring 79 holds the hook yieldingly in position for engaging the plate while held by the side gages on the upper part of the box so that upon the reverse motion of the sliding rack, the plate will be drawn out of the box longitudinally. The plate is drawn on a pair of supports 80 each of which is bifurcated to permit the hook to pass between them. These supports are fixed in any position along a cross rod 189. The stroke of the lever 67 is adjustable for plates of different sizes. This is done by providing a collar 81 on the spring rod. This collar has a set screw which comes up against a bracket 82 on the frame and according to its adjustment holds the cam roll off the low part of the cam, so as to shorten the stroke. It will be observed also that as the hooks draw the plates out in the manner just described, they are brought against the edge trimming saws 83 and their edges by which they are held up in the upper half of the mold are trimmed while being drawn out. These saws are operated by a pulley 84 (Figs. 2 and 3) on the transverse shaft 32 at the end of the machine. This pulley has a belt 85 upon it which passes around idlers 86 to the pulley 87 on the saw shaft. For some classes of work these saws can be dispensed with as the edge bevels can be made accurately enough by the gages.

Between the supports 80 is a support 88 which helps carry the plate when it has been moved out by the first carrier hooks 78. When the plate reaches the position on the supports 80 and 88 its course is changed exactly at right-angles and the plate is delivered from the main body of the machine by the following mechanism.

On the shaft 40 are a pair of cams 90 and 90ª operating rollers 91 and 91ª on a pivot arm 92 which carries a gear segment 93. This gear segment operates a pinion 94 which oscillates a shaft 95 mounted in brackets 96 on the frame and this shaft through a gear or pinion 97 reciprocates a rack 98. This rack is fixed to a slide 89 which moves along a transverse guide 99. Upon the slide is located a rod 100 having fixed pushers 101 which engage the rear of the plate and slide it along over a guide 102. This brings the plate into a position on a flat support 103 secured on a fixed bracket 104 on the side of the frame. This support is provided with an upturned edge 105 against which the edge of the plate is adapted to be moved. It is provided also with a rib 205 entering in the notch P³ in the plate to prevent the blade moving the plate back on its rearward travel.

Mounted on the end of the shaft 38 is a crank arm 106 having a roller 107 thereon adapted to move in a vertical groove 108 on a slide 109. This slide moves in ways 110 on the bracket 104. Carried on this slide is a blade holder 111 on which is mounted a shaving blade 112. Also on the slide are arms 113 carrying a roller 114 yieldingly pressed down by springs 115. As the slide travels longitudinally of the machine it passes the blade over the plate and shaves the back thereof, the roller pressing down on the plate in front of the blade to prevent buckling of the plate. It will be understood that the edge of the plate is held against the projection 105 at this time. For some classes of work the shaving blade can be dispensed with as the plate can be cast to thickness within a few degrees of accuracy.

After this shaving operation takes place, the rack 98 is moved back to get another plate. When the slide 89 moves back there is no plate in position behind these pushers 101 and there is no obstacle to their backward motion. On the slide are two rock shafts 117 having pushers 118 and 119 respectively fixed thereon. Each rod has an arm 120 extending upwardly between a pair of lugs 121 on a rod 122. This rod is carried in bearings fixed on the slide and moves with it but is free to slide in its bearings. As the slide approaches the end of its stroke the rod 122 comes against an adjustable stop 123 on an arm 124. The continued motion of the slide moves the rod back so as to tip the pushers 118 and 119 up out of the way of the plates, so that the slide can move back. As it approaches the other end of its travel the rod is moved the other way by the adjustable stop 125 on another arm 125ª. This turns the pushers back into position with their lower ends below the tops of the plates so that the pushers 118 are ready to remove a plate from the support 103 and the pushers 119 to advance the preceding plate out of the machine.

As each plate is pushed off the support 103 its untrimmed edges engage guides 126 and 127 of the same shape as the end gages of the mold so as to fit the edges of the plate, and it moves on laterally adjustable supports 130 and passes over a pair of saws 131 which cut off the head and tail and trim or bevel the edges. These saws are operated as follows:—The shaft 32 by means of beveled gears 133, drives a longitudinal shaft 134 on which is a pulley 135 which by means of a belt 136 drives the saw pulley 137. This belt passes over adjustable idlers 138.

At the sides of the supports 130 are edge supports 140 having upwardly projecting guides for entering the saw kerfs and engaging the beveled edges cut by the saws 131 and guiding the plate during the rest of its course. The plate is held under edge plates 141 and 142, one of which is laterally adjustable.

Figures 10, 11:
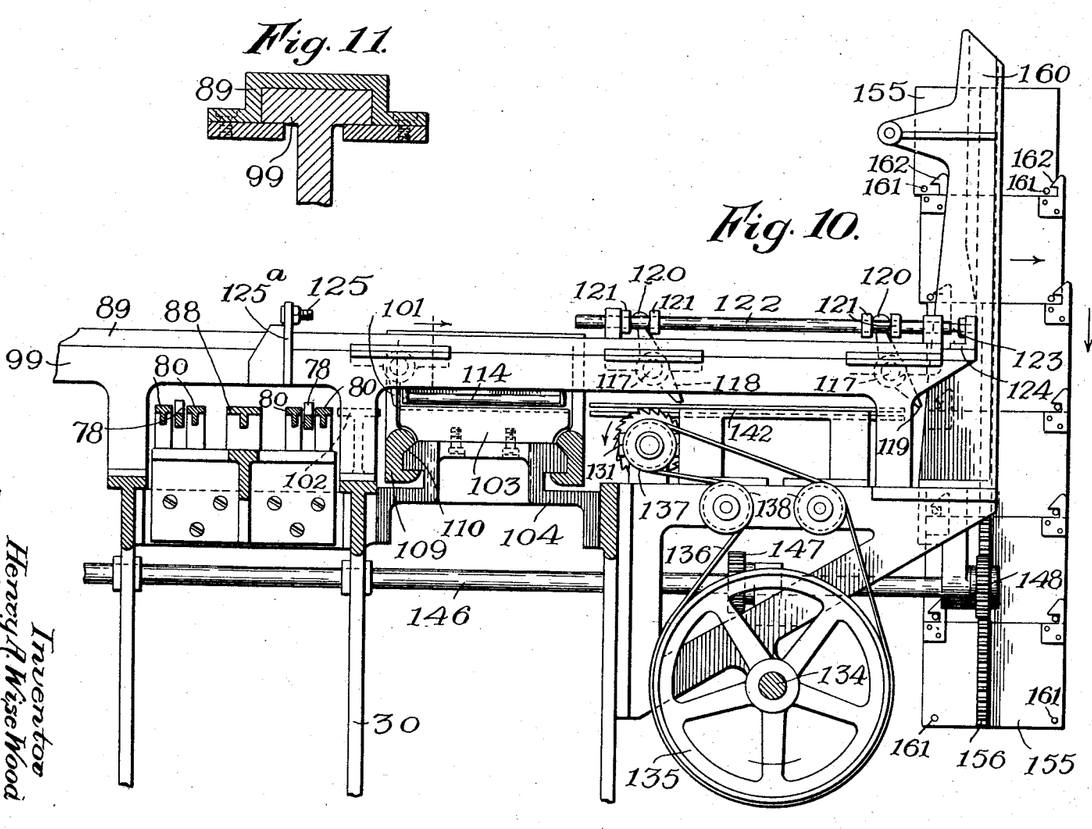
Fig. 10 is a sectional view on the line 10—10 of Figs. 1 and 8, a part being shown in section on the line X—X in Fig. 1.
Fig. 11 is a transverse sectional view on an enlarged scale of a portion of a guide shown in Fig. 10.
Figure 12:
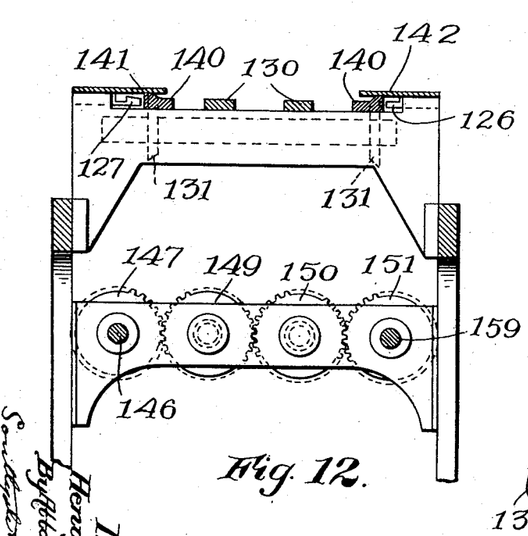
Fig. 12 is a sectional view on the line 12—12 of Fig. 8.
Figure 13:
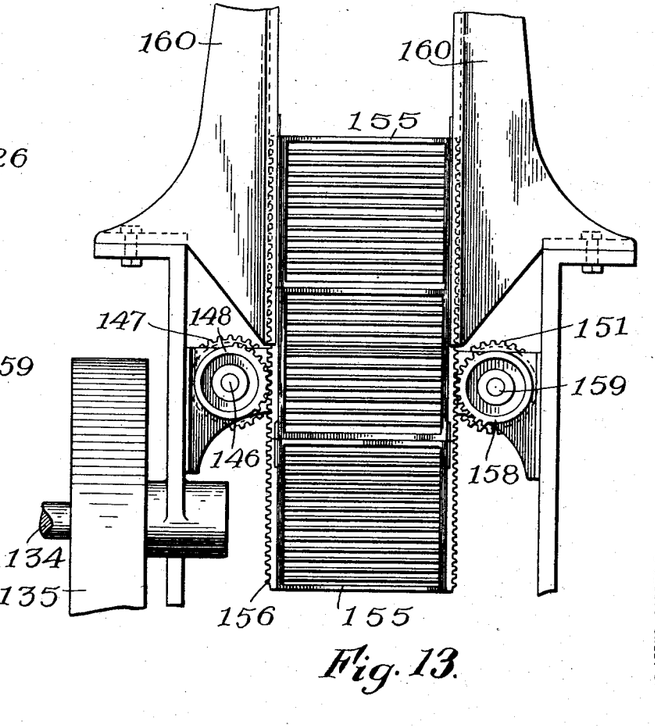
Fig. 13 is an elevation of the plate delivery means shown in Fig. 4.

On the shaft 40 is a worm gear 145 driving a transverse shaft 146, on which are two gears or pinions 147 and 148 at the rear of the machine. The gear 147 drives gears 149, 150 and 151, arranged in alinement. The delivery boxes 155 are provided with rack teeth 156 on their sides, which are engaged by the gears 148 and 158. These boxes slide down in ways 160 until they hang below the machine and can be removed by hand. They have pins 161 and hooks 162 so that they can be inserted as is indicated by the arrows in Fig. 10. They are dropped the distance of one shelf at each operation of the machine.

The connections between the shaft 38 and gear 37 comprise a disk 262 fixed on the shaft 38 and having a pin 261 passing through it into the web of the gear 37. This pin is provided with a reduced cross section so that in case of any obstruction to the proper operation of the machine sufficient to cause breakage, the breakage will occur at this point. The same construction is provided between the beveled gear 39 and a disk 163 on the shaft 40.

Figure 6:
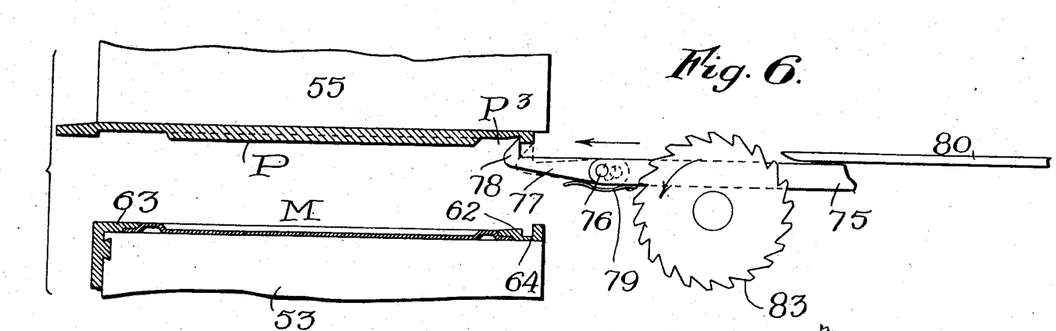
Fig. 6 is a vertical sectional view of part of the mold showing the plate in position to be removed.
Figures 7, 7A:
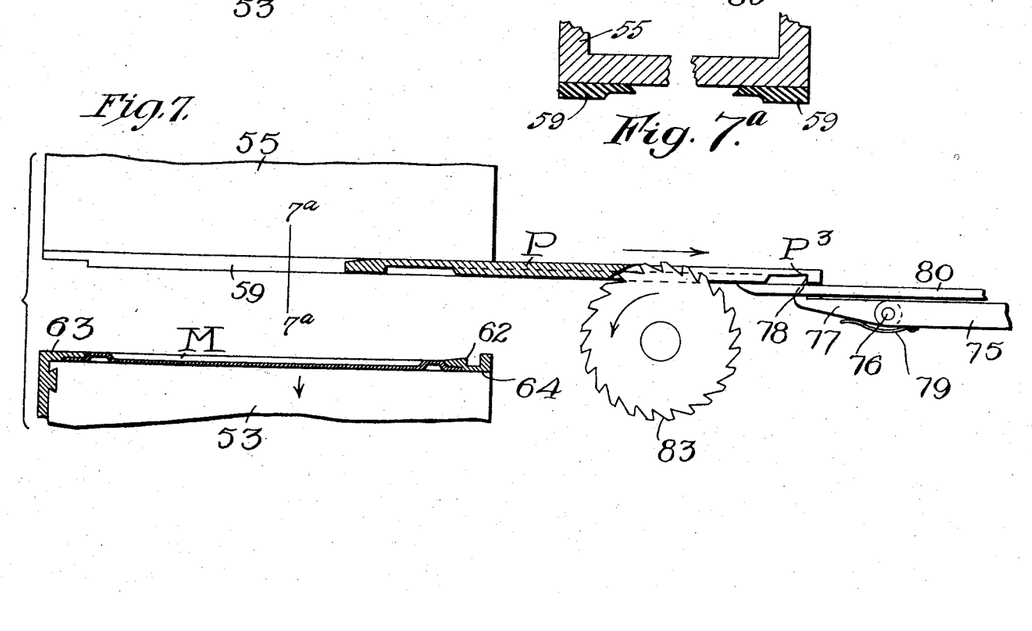

In operation the casting box remains closed long enough to allow the plate to harden. Then the lower box moves down. The upper box remains substantially in the first position with the cast plate held by the side gages which underlie its edges, as has been stated. As the lower box moves down the first carrier hooks move up into the position shown in dotted and then in full lines in Fig. 6 where they enter the notches P³ in the plate. Then they start to move as shown in Fig. 7 and draw the plate on the supports 80. During this operation the projecting beveled edges formed by the side gages are guided by the latter and are then trimmed by the saws 83. When the plate reaches the end of its travel on the supports 80 the pushers 101 are at the end of their stroke and ready to move back to push the plate laterally from this position on the support 103. These pushers then move back and dwell at the rear of the stroke during the entire reciprocation of the hooks.

The next operation of the plate is to shave the back by means of the shaving blade 112, the operation of which has been described in full. During the time when the pushers remain in their rearward position the shaving blade moves back. On the next operation while the pushers 101 start forward to move the next plate into position on the support, the pivoted pushers 118 engage the plate which has just been shaved and push it out on the supports 130 as has been described; at this time the other edges are being trimmed by the saws 131.

It will be observed that as there is a plate on the support 103 during the rearward motion, the second set of pushers are lifted by the operation of the sliding rod as has been previously described. But the first set of pushers does not have to be lifted because when they travel back there is no plate in their path. During each forward motion the third set of pushers 119 deliver the plates from the position in which their ends are trimmed, into the delivery boxes.

While I have illustrated and described a preferred embodiment of the invention and shown it as applied to the finishing of flat printing plates, I am aware of the fact that many modifications can be made in the various details of construction and the sequence of operations and that most of the parts can be employed for finishing stereotype plates, and in fact other articles, of different shape and character from the plates specified, and that certain parts can be omitted without departing from the scope of this invention. For example, the first or second sets of trimming saws, or both, can be omitted, and even the shaving device can be omitted (the corresponding functions being dispensed with) without reorganizing the remainder of the machine. Therefore, I do not wish to limit myself to the details of construction or sequence of operations or shape of plates described herein, except as defined by the appended claims:

1. In a stereotype plate finishing machine, the combination of means for supporting a plate, means for moving a plate on said supporting means, means for trimming the edges of said plate during the motion thereof, means for pushing the plate laterally from said support, and means for thereafter shaving the back of the plate while in the position in which it is left by said pushing means.

2. In a stereotype plate finishing machine, the combination of means for supporting a plate, means for moving a plate on said supporting means, means for trimming two edges of said plate during the motion thereof to said supporting means, means for pushing the plate laterally from said support, and reciprocable means for shaving the back surface of the plate while in the position in which it is left by said pushing means.

3. In a stereotype printing plate finishing machine, the combination of three supports for printing plates arranged in alinement, a reciprocatory member, three sets of pushing devices movable with said reciprocatory member, each movable over one of said supports, automatic means for raising the second and third pushing devices on their backward stroke to bring them out of position to engage the plates, and means for cutting off the edges of the plate while moving from the second to the third support.

4. In a stereotype printing plate finishing machine, the combination of three supports for printing plates, a reciprocatory member, three sets of pushing devices movable with said reciprocatory member over said supports, automatic means for raising the second and third pushing devices on their backward stroke to bring them out of plate engaging position and means for trimming the edge of a plate while being moved by one of said pushing devices.

5. In a stereotype printing plate finishing machine, the combination of means movable longitudinally with respect to the plate for shaving the back of the plate, means for thereafter moving the plate laterally on a support, and means for trimming the edges of the plate during the motion of the plate.

6. In a stereotype printing plate finishing machine, the combination of three supports for a flat plate all arranged substantially in the same plane, reciprocatory means for engaging a plate on the first support and moving it on the second support, means for shaving the back of the plate while on the second support, and means movable with the first named means for pushing a plate from the second support to the third support and removing a plate from the third support.

7. In a stereotype plate finishing machine, the combination of a support for the plates, a second support adjacent thereto, a guide on the second support shaped to fit the edge of said plate and guide the plate, and means located beyond said guide for trimming off said edge.

8. In a stereotype plate finishing machine, the combination of a support for the plates, a second support adjacent thereto, a pair of guides for the plate on the second support shaped to fit the edges of said plate, means for trimming off said edges, and means located over said guides for holding the plate down while being trimmed.

9. In a stereotype printing plate finishing machine, the combination of a stationary support for a printing plate, means for performing a finishing operation on a plate while on said support, means for moving a plate from said support, a guide arranged near the end of said support for delivery boxes, and means for moving the delivery boxes along the guide when a plate is fed from the support.

10. In a machine for finishing stereotype printing plates, the combination of a guide for a plate, a finishing mechanism in alinement with said guide, a series of delivery boxes having shelves therein arranged to travel past said support, means for delivering a plate along said guide on a shelf of a delivery box, and means for moving the delivery boxes forward when a plate is delivered.

11. In a machine of the character described, the combination of stereotype plate finishing devices, a delivery mechanism for the plates comprising a guide and delivery boxes movable along the guide into a position in alinement with said finishing devices, each box having a rack thereon, and means for engaging said racks and feeding the boxes forward.

12. In a machine of the character described, the combination of devices for finishing a cast plate, a series of delivery boxes movable into position to receive a plate from the finishing devices, and devices mounted on the boxes for connecting each box with the preceding and following ones.

13. In a stereotype plate finishing machine, the combination of means for supporting a plate, means for moving a plate on said supporting means, means for pushing the plate laterally from said support, and means for thereafter shaving the back of the plate while in the position in which it is left by said pushing means.

In testimony whereof I have hereunto set my hand.

HENRY A. WISE WOOD.

Copies of this patent may be obtained for five cents each, by addressing the "Commissioner of Patents, Washington, D. C."